United States Patent
Broach et al.

(10) Patent No.: US 7,589,517 B1
(45) Date of Patent: Sep. 15, 2009

(54) ADAPTIVE SLOPE COMPENSATION FOR SWITCHING REGULATORS

(75) Inventors: Michael Eugene Broach, San Mateo, CA (US); Frank John De Stasi, San Leadro, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/781,805

(22) Filed: Jul. 23, 2007

Related U.S. Application Data

(60) Division of application No. 10/780,375, filed on Feb. 17, 2004, now Pat. No. 7,265,530, which is a continuation-in-part of application No. 10/703,960, filed on Nov. 7, 2003, now Pat. No. 7,042,207.

(51) Int. Cl.
  *G01R 15/18* (2006.01)
  *G05F 3/00* (2006.01)

(52) U.S. Cl. .................................. 324/117 R; 323/288

(58) Field of Classification Search ........................ None
  See application file for complete search history.

(56) References Cited

U.S. PATENT DOCUMENTS

| | | | | |
|---|---|---|---|---|
| 4,403,279 | A | 9/1983 | Hirsch et al. | 323/222 |
| 4,672,518 | A | 6/1987 | Murdock | 363/21 |
| 4,717,994 | A | 1/1988 | Diaz et al. | 363/21 |
| 4,837,495 | A | 6/1989 | Zansky | 323/222 |
| 4,975,820 | A | 12/1990 | Szepesi | 363/21 |
| 5,079,453 | A | 1/1992 | Tisinger et al. | 327/132 |
| 5,731,731 | A | 3/1998 | Wilcox et al. | 327/403 |
| 5,903,452 | A | 5/1999 | Yang | 363/97 |
| 6,066,943 | A | * 5/2000 | Hastings et al. | 323/285 |
| 6,246,222 | B1 | * 6/2001 | Nilles et al. | 323/283 |
| 6,282,111 | B1 | 8/2001 | Illingworth | 363/98 |
| 6,285,174 | B1 | * 9/2001 | Suzuki | 323/288 |
| 6,487,099 | B1 | 11/2002 | Perkins et al. | 363/98 |
| 6,522,116 | B1 | * 2/2003 | Jordan | 323/288 |
| 6,661,224 | B1 | 12/2003 | Linder | 324/227 |
| 6,778,665 | B1 | 8/2004 | Fischer et al. | 379/413 |

(Continued)

OTHER PUBLICATIONS

C. K. Tse, et al., "Control of Bifurcation in Current-Programmed DC/DC Converters: A Reexamination of Slope Compensation," *IEEE International Symposium on Circuits and Systems Geneva 2000*, May 28-31 2000, vol. 4 - pp. 671-674.

(Continued)

*Primary Examiner*—Jermele M Hollington
(74) *Attorney, Agent, or Firm*—Merchant & Gould, P.C.

(57) ABSTRACT

A system, method, and apparatus are arranged to provide adaptive slope compensation in a switching regulator that includes an inductor. A control loop of the switching regulator is responsive to a ramp signal. A ramp generator that includes a capacitor circuit and a current source provides the ramp signal, where at least one of the current level of the current source and the value of the capacitor circuit are adjusted to vary the slope of the ramp signal. The adjustment of the ramp signal is responsive to at least one of: a set point for the output voltage of the switching regulator, a feedback voltage that is related to the output voltage, and a measured parameter associated with the inductor in the switching regulator. By dynamically adjusting the slope of the ramp signal, slope compensation is provided for a range of inductor values that can dynamically change during operation.

18 Claims, 12 Drawing Sheets

U.S. PATENT DOCUMENTS

| | | | |
|---|---|---|---|
| 6,828,766 B2 | 12/2004 | Corva et al. | 323/284 |
| 6,841,979 B2 | 1/2005 | Berson et al. | 323/282 |
| 6,909,268 B2 * | 6/2005 | Taghizadeh-Kaschani | 323/284 |
| 6,952,093 B1 * | 10/2005 | Broach et al. | 324/158.1 |
| 7,042,207 B1 | 5/2006 | Broach | 324/117 R |
| 7,265,530 B1 * | 9/2007 | Broach et al. | 324/117 R |
| 7,342,392 B2 * | 3/2008 | Liao | 323/282 |
| 7,378,822 B2 * | 5/2008 | Liao | 323/222 |
| 2006/0006854 A1 * | 1/2006 | Oswald et al. | 323/282 |
| 2007/0013355 A1 * | 1/2007 | Liao | 323/288 |
| 2007/0035283 A1 | 2/2007 | Liao | 323/282 |
| 2007/0108947 A1 | 5/2007 | Liao | 323/222 |
| 2007/0120547 A1 * | 5/2007 | Tateishi et al. | 323/282 |
| 2007/0285073 A1 * | 12/2007 | Nishida | 323/288 |
| 2007/0296389 A1 * | 12/2007 | Chen et al. | 323/290 |

OTHER PUBLICATIONS

C. K. Tse, et al., "Control of Bifurcation in Current-Programmed DC/DC Converters: An Alternative Viewpoint of Ramp Compensation," *IEEE 26th Annual Conference of Industrial Electronics Society*, Oct 22-28, 2000, vol. 4 - pp. 2413-2418.

Chung-Chieh Fang, "Exact Orbital Stability Analysis of Static and Dynamic Ramp compensations in DC-DC Converters," *IEEE International Symposium on Industrial Electronics*, Jun. 12-16, 2001, vol. 3, pp. 2124-2129.

* cited by examiner

ADAPTIVE SLOPE COMPENSATION FOR SWITCHING REGULATORS

RELATED APPLICATION

This patent application is a divisional of U.S. patent application Ser. No. 10/780,375, which was filed on Feb. 17, 2004, now U.S. Pat. No. 7,265,530 as a continuation-in-part of U.S. patent application Ser. No. 10/703,960, which was filed Nov. 7, 2003, now U.S. Pat. No. 7,042,207 and claims the benefit under 35 U.S.C. 120 of the filing date.

FIELD OF THE INVENTION

The present invention relates to a system and method for adaptively adjusting parameters in a switching regulator based on a slope that is associated with an inductor in the switching regulator. The adaptive adjustment method is appropriate for use in a switching regulator such as a buck regulator, a boost regulator, or a buck-boost regulator.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Figure 1:
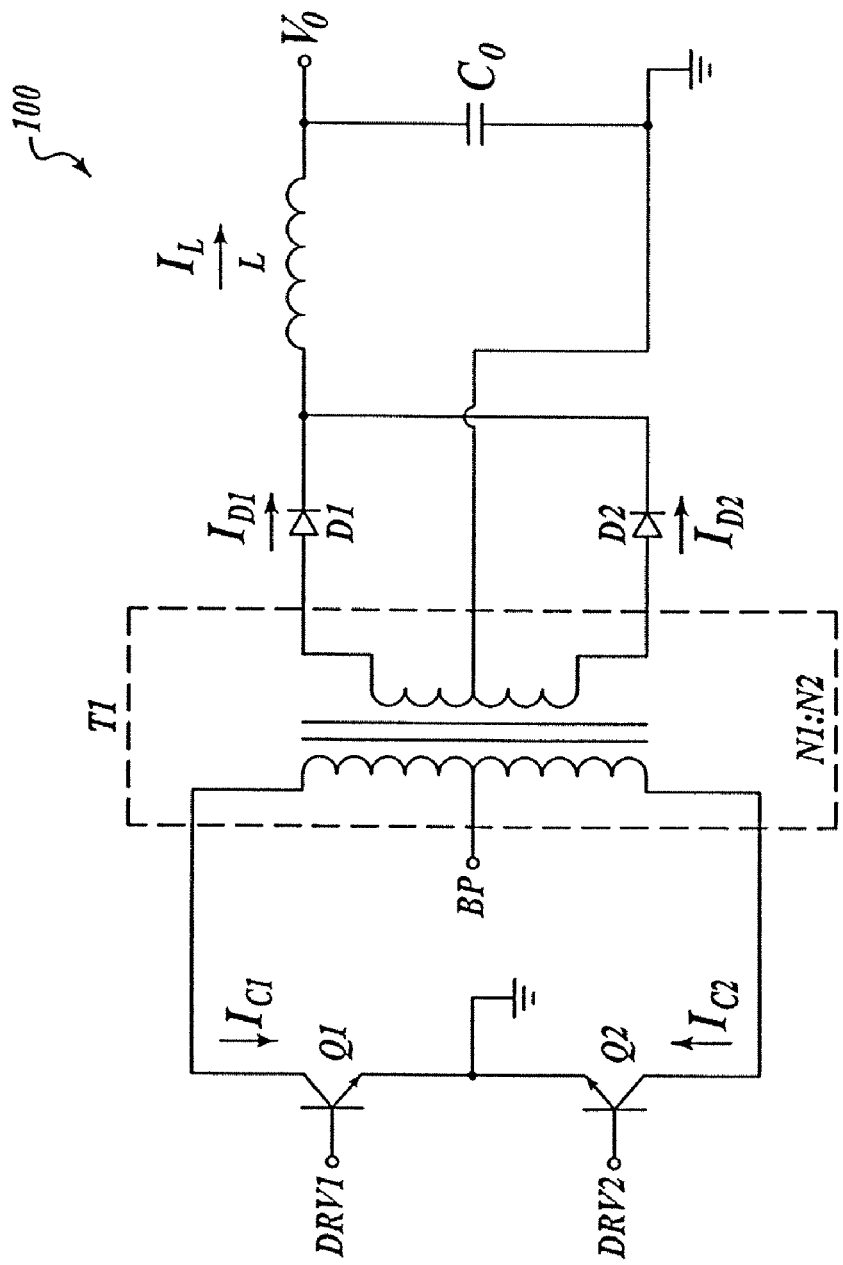
FIG. 1 is an illustration of a conventional push-pull type PWM converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system, method, and apparatus for providing adaptive slope compensation in a switching regulator that includes an inductor. A control loop of the switching regulator is responsive to a ramp signal. A ramp generator that includes a capacitor circuit and a current source provides the ramp signal, where at least one of the current level of the current source and the value of the capacitor circuit are adjusted to vary the slope of the ramp signal. The adjustment of the ramp signal is responsive to at least one of: a set point for the output voltage of the switching regulator, a feedback voltage that is related to the output voltage, and a measured parameter associated with the inductor in the switching regulator. By dynamically adjusting the slope of the ramp signal, slope compensation is provided for a range of inductor values that can dynamically change during operation.

Measured Inductor Characteristics

Inductors in switching electronic circuits are typically made out of ferrites or some other core material that has a higher permeability than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably. The inductor voltage (VL) and the inductor current (IL) are related to one another by: $\Delta IL/\Delta t = \Delta VL/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

The various measurements of voltages and/or currents can be used to calculate values of characteristics associated with the inductor. Example characteristics include: inductor value, series resistance, slew rate in non-saturation, slew rate in saturation, average operating current, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used in a control system such as in a switching-type converter (or regulator) to adaptively change control parameters such as: current limit, switching time, small signal compensation, and slope compensation.

Conventional circuits often include compensation to prevent undesirable effects such as oscillations, or some other instability or non-linearity in the control loop. In the present invention, characteristics associated with the inductor are measured and various control parameters associated with compensation of the circuit are dynamically adjusted by the control circuit to accommodate a wide range of inductor values and saturation ratings. In one example, a parameter in the control loop is dynamically adjusted (e.g., additional current sources are enabled, a feedback amount is changed, a gain is adjusted, etc.) to change the compensating ramp associated with the inductor. In another example, a parameter in the control loop is dynamically adjusted based on the rate of discharge in the inductor to change the slope compensation for the inductor.

Figure 2:
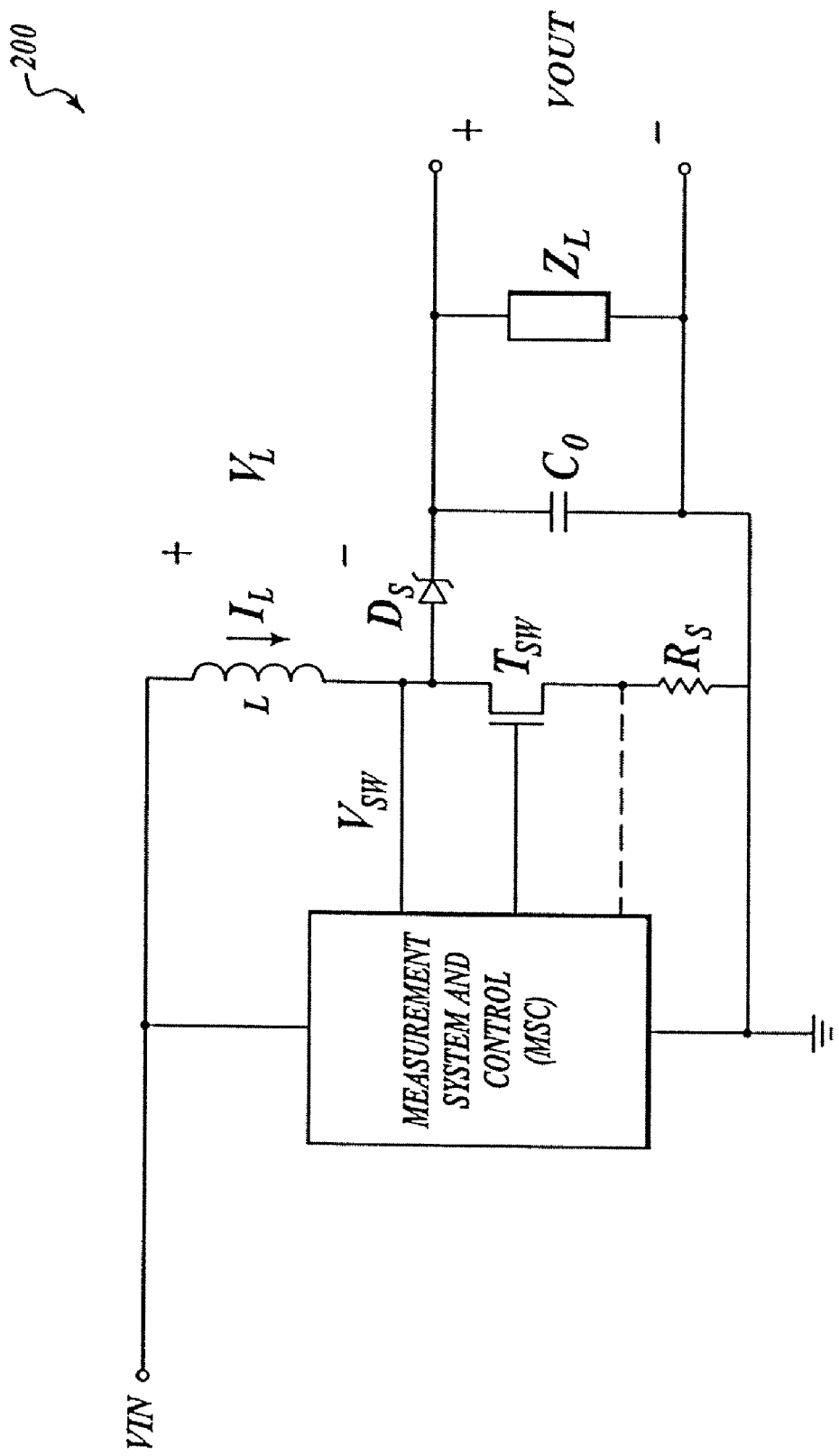
FIG. 2 is an illustration of an example embodiment of a switching converter arranged according to at least some features of the present disclosure.

FIG. 2 is an illustration of an example embodiment of a switching converter (200) that is arranged according to an aspect of the present invention. Switching converter 200 includes an inductor (L), a switching transistor (TSW), a diode (DS), a capacitor (CO), a load circuit (ZL), and a measurement and system control (MSC) block.

Inductor L is charged when switching transistor TSW is active. Inductor current (IL) is delivered to capacitor CO and load circuit ZL via diode DS when transistor TSW is inactive. In a normal operating mode, the MSC block is arranged to actuate switching transistor TSW such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta VL$) is determined by monitoring the input voltage (VIN) and the switch voltage (VSW). In one example embodiment, the change in inductor current ($\Delta IL/\Delta t$) is determined by monitoring the change in voltage across the switching transistor ($\Delta VDS$) and calculating: $(\Delta IL/\Delta t) = (\Delta VDS/\Delta t)/rdson$, where rdson is the on resistance of switching transistor TSW. An optional resistor (RS) may be placed in series with switching transistor TSW to facilitate measurement of the inductor current.

Figure 3:
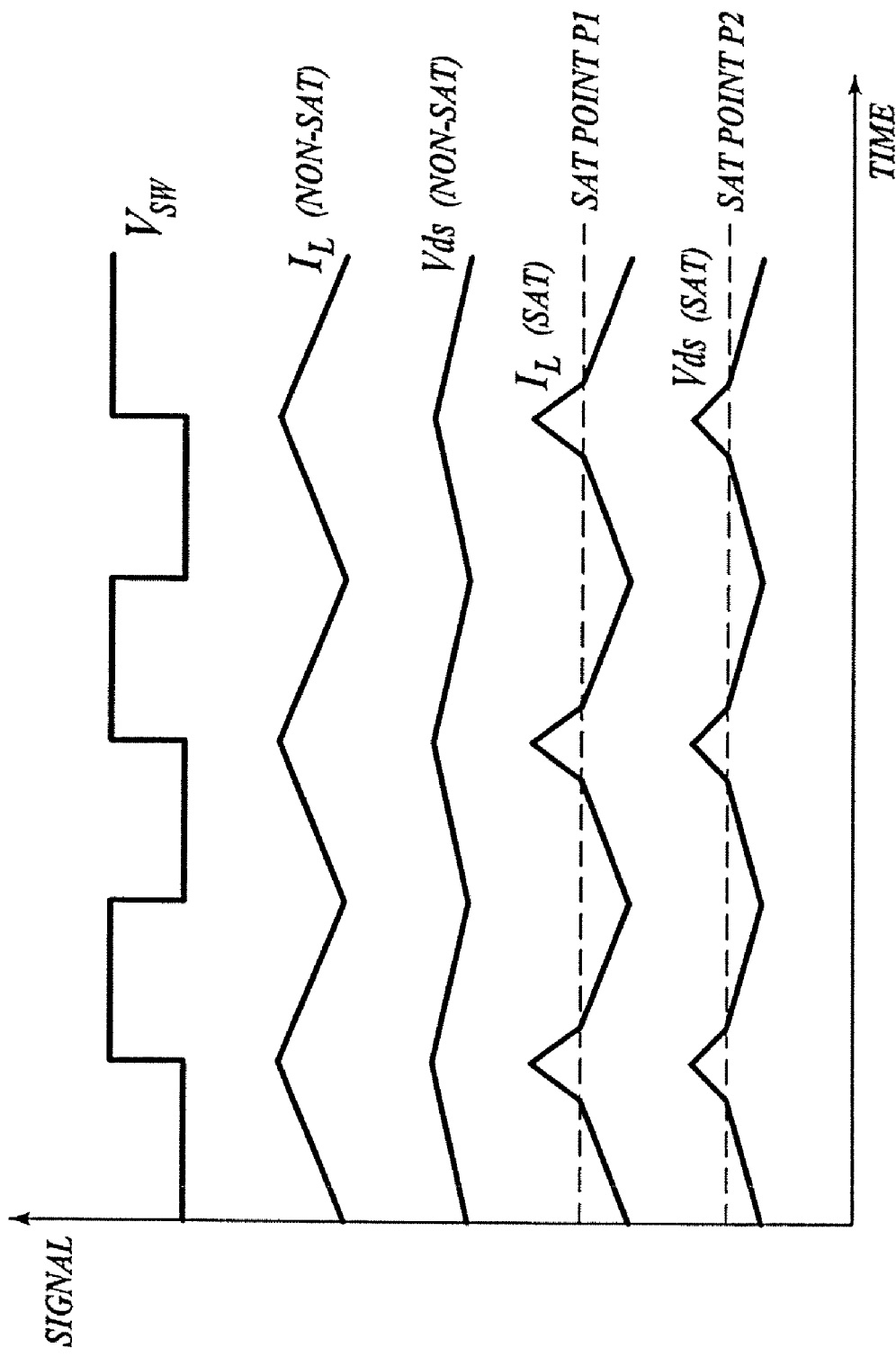
FIG. 3 is an illustration of example waveforms for a switching converter arranged according to at least some features of the present disclosure.

FIG. 3 is an illustration of example waveforms for a switching converter such as that illustrated in FIG. 2. Ideally, the inductor does not reach a saturation point and the inductor current (IL) and the voltage across transistor TSW (VDS) changes linearly in proportion to the value of the inductor. The non-ideal effects of inductor saturation are also illustrated as the inductor current (IL) and the voltage across transistor TSW (VDS) experience a measurable change in slope when the saturation points (P1 and P2) are reached. The voltage across resistor RS (when found in circuit 200) has the same shape as VDS.

Figure 4:
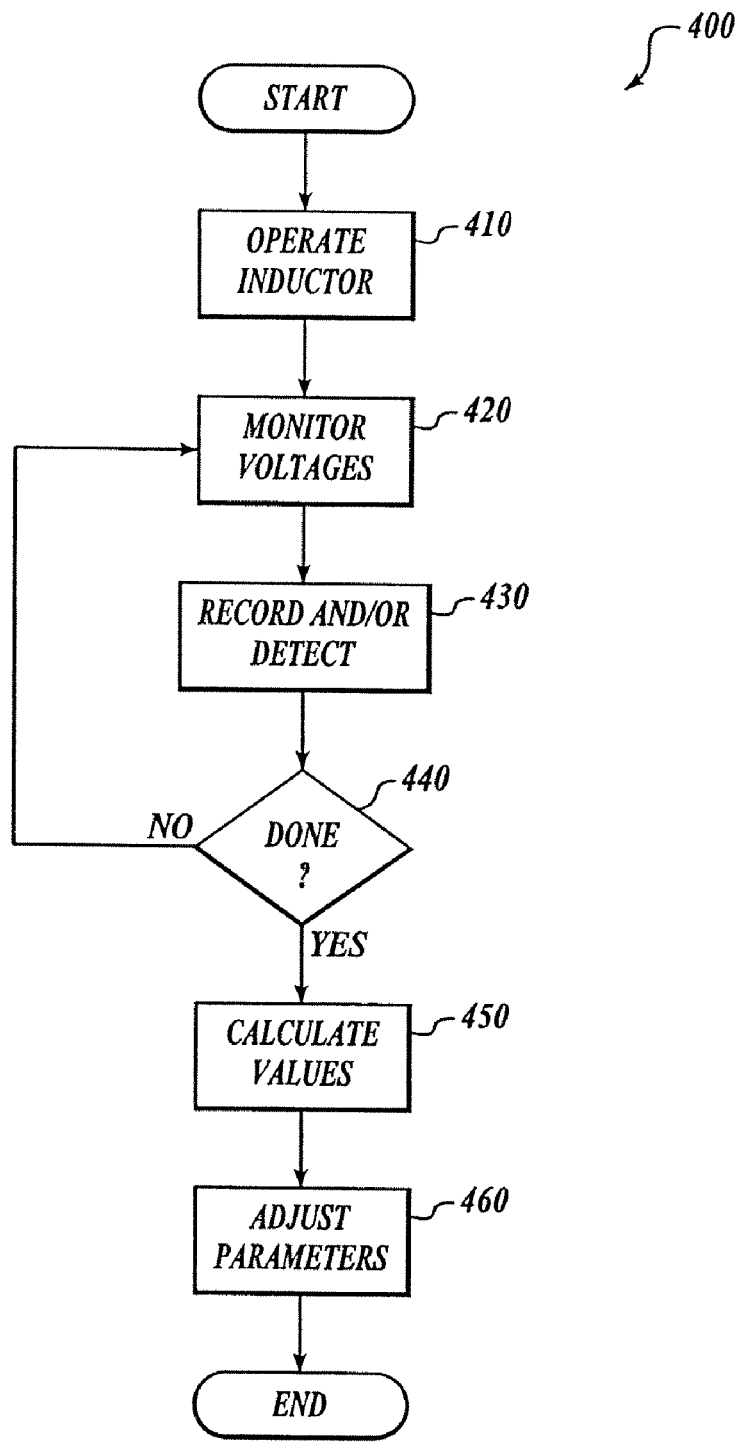
FIG. 4 is an illustration of a procedural flow for an example measurement system arranged according to at least some features of the present disclosure.

FIG. 4 is an illustration of a procedural flow for an example measurement system that is useful for the present invention. After the measurement mode is activated by some triggering event, processing continues at block 410 where the inductor is operated for one or more cycles. At block 420, voltages (e.g., VIN, VSW, VDS, VRS, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450 values associated with the inductor (e.g., inductance value, slew rate, saturation point, etc.) are calculated. The calculated values can be used by other circuits or systems to adjust one or more parameters (e.g., current limit, slope compensation, etc).

In one example, voltages are monitored by an analog-type circuit that detects the change in slope associated with the current and/or voltage associated with the inductor. In another example, the inductor voltages are monitored by an analog-to-digital converter. In this example, either the digital values can be recorded in a memory and later retrieved for calculation purposes, or the digital values can be evaluated in real time to determine the rate of change in the voltages. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
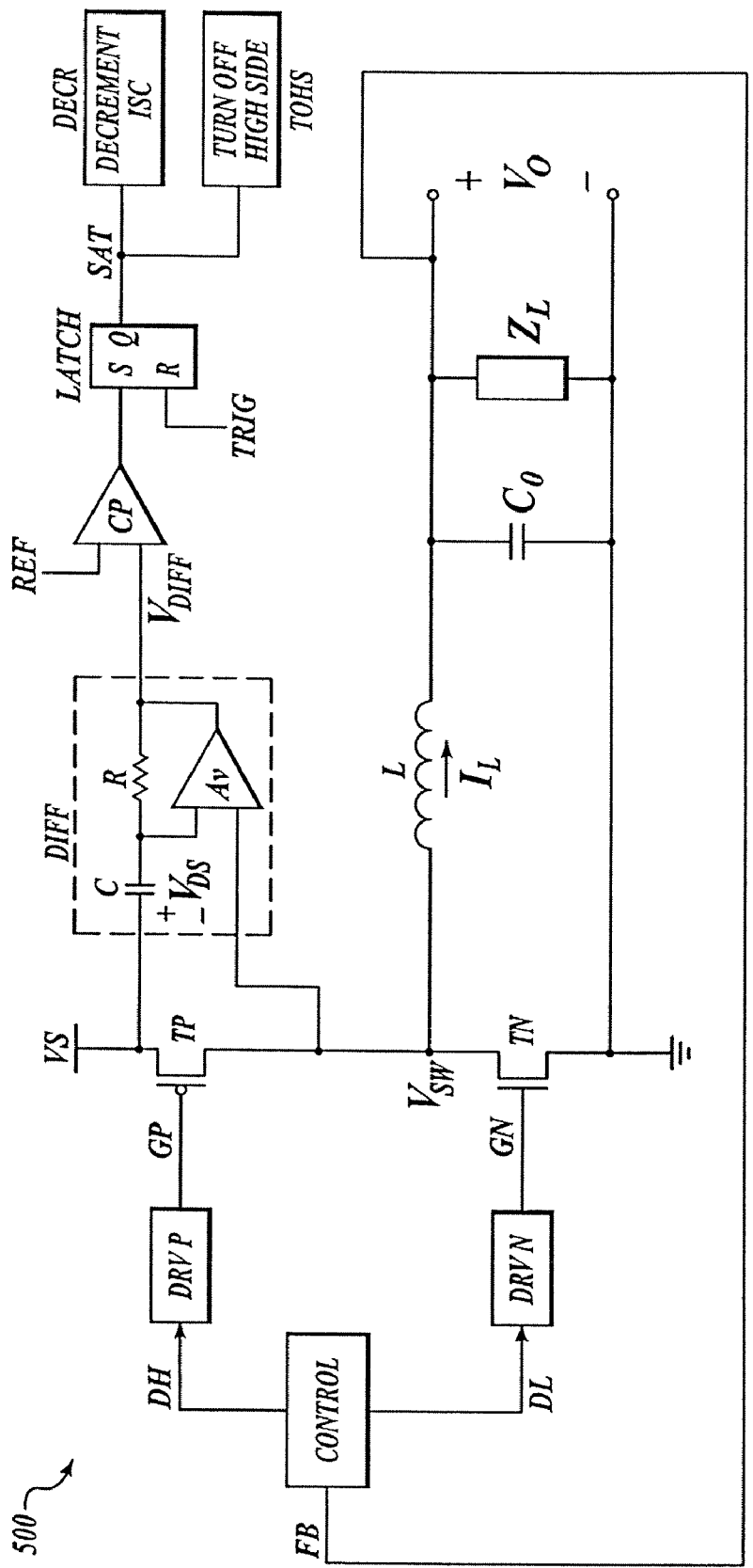
FIG. 5 illustrates another example embodiment of a switching converter with analog differentiator processing system arranged according to at least some features of the present disclosure.

FIG. 5 illustrates another example embodiment of a switching converter (500) that is arranged in accordance with an aspect of the present invention. Switching converter 500 is a buck-type converter that includes a p-type transistor (TP), and n-type transistor (TN), drivers (DRVP, DRVN), a controller (CNTL), a differentiator (DIFF), a comparator (CP), an SR-type latch (LATCH), a decrement circuit (DECR), a high-side turn-off circuit (TOHS), an inductor (L), a capacitor (CO), and a load circuit (ZL).

The controller (CNTL) is arranged to provide drive signals DH and DL to drivers DRVP and DRVN, respectively. Driver DRVP provides a gate control signal (GP) to p-type transistor TP, while driver DRVN provides another gate control signal (GN) to n-type transistor TN. The p-type transistor (TP) is arranged to operate as a high side switch that couples the inductor (L) to the high power source (VS). The n-type transistor (TN) is arranged to operate as a low side switch that couples the inductor (L) to the low power source (e.g., GND). Capacitor CO is coupled in parallel with load circuit ZL. A feedback signal (FB) is provided from VO to the controller (CNTL).

An example differentiator illustrated in FIG. 5 includes a capacitor (C), a resistor (R), and an amplifier (AV). The differentiator is arranged to monitor the drain-source voltage (VDS) of p-type transistor TP and provide a signal (VDIFF) that is proportional to $\Delta VDS/\Delta t$. The signal (VDIFF) is used to adjust parameters within the circuit such as, for example, small-signal compensation, slope compensation, and current limit.

Figure 6:
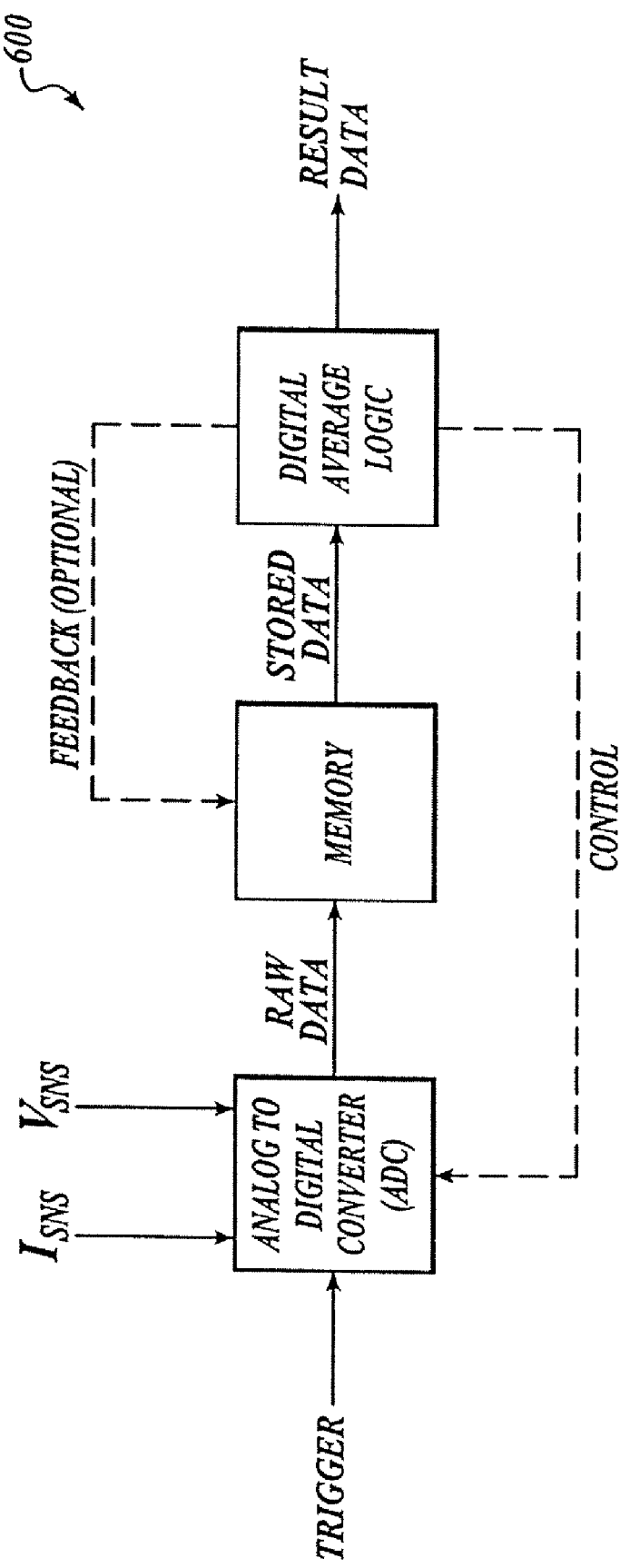
FIG. 6 illustrates an example of a digital processing circuit arranged according to at least some features of the present disclosure.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta VDS/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, calculate the slope of the inductor current, filter noise from the sampled data, discard anomalous data from the sampled data points, determine an appropriate current limit, determine a slope compensation parameter(s), determine a small-signal compensation parameter(s), as well as provide other calculations.

Slope Compensation Generally

Current mode control topologies can be applied to buck, boost, buck-boost, and other switching type converters/regulators. One example conventional buck regulator is operated at a fixed frequency with current mode control that includes peak current sensing for the inductor. Non-ideal effects are observed in this example regulator such as: an instability for duty cycles above 50%, poor loop response as the result of peak sensing instead of average inductor current, tendencies towards sub-harmonic oscillations, and poor noise sensitivity. The above-described instabilities are independent of regulator topology and may occur even when the voltage regulation loop is operated open loop. These and other non-ideal effects are addressed by adaptively adjusting the slope of the compensating ramp that is associated with the inductor current in accordance with the present invention.

According to an example of the present invention, a timing ramp is introduced into the current programming control loop. The slope of the inductor current determines the preferred amount of compensation that is provided by the slope (me) of the timing ramp. According to the present invention, the slope of the ramp (me) is related to a slope of the inductor current according to a scaling factor. In one example, the slope of the ramp (me) corresponds to a fraction of the downward slope associated with the inductor current (m2). In another example, the slope of the ramp (me) corresponds to a multiple of the downward slope associated with the inductor current (m2). In yet another example, the slope of the ramp (me) is matched to the downward slope associated with the inductor current (m2).

The topology selected and the desired optimization factor for the converter/regulator will dictate the selection of the scaling factor. The value of the downward slope of the inductor current (m2) depends on the regulator topology, the value associated with the inductor, as well as other system parameters. An example buck or buck-boost regulator may have a downward slope (m2) that is determined by the ratio of the output voltage (VOUT) and the inductor value (L) as: m2=VOUT/L. In contrast, an example boost regulator may have a downward slope (m2) that is related to the inductor value (L), and the difference between the input voltage (VIN) and the output voltage (VOUT) as: m2=(VOUT−VIN)/L. In each case, the downward slope (m2) is inversely proportional to the value associated with the inductor (L).

The value associated with the inductor (L) can vary during operation. This is largely the result of the various materials that are used in the inductor. Many power inductors are built with a core material that exhibits some change in permeability with flux density. The flux density depends on the magnitude of operating current in the inductor. In a regulator system, the inductor current is largely dependent on the load current for the system. Since the load current may change over time, the flux density of the inductor will change accordingly. Moreover, it may be desirable to support a range of inductor values so that the system designer for the regulator is afforded some flexibility in design and suppliers for the inductors.

As described previously, a measurement signal can be generated that is proportional to a value associated with the inductor (L). According to the present invention, the measurement signal can be used to adjust the slope of the compensation ramp (me) to compensate for changes in L. By dynamically adjusting the slope of the compensation ramp (me), large variations in the inductance value (L) can be accommodated without changing the internal constants of the regulator.

Example Slope Compensation Mechanism for Buck and Buck-Boost Type Regulators

Figure 7:
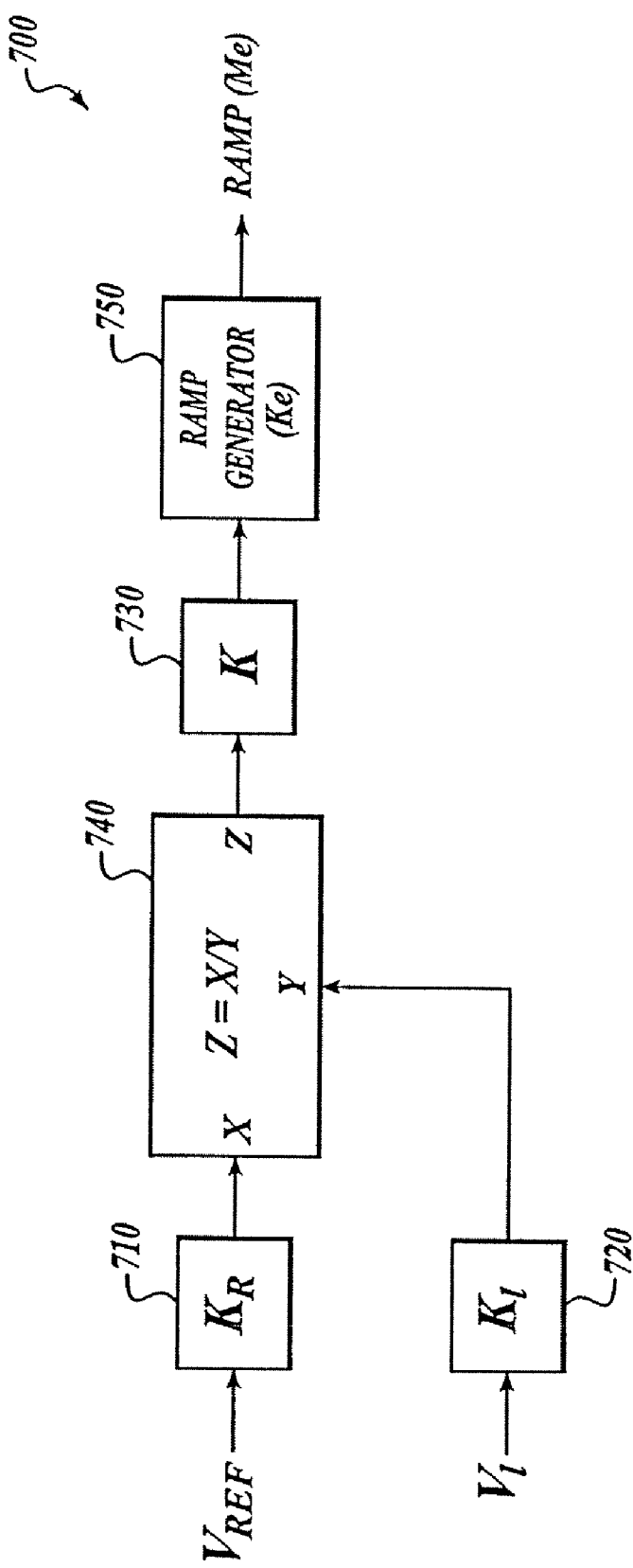
FIG. 7 illustrates an example block diagram of a dynamic slope adjustment mechanism for a buck or buck-boost type regulator arranged according to at least some features of the present disclosure.

FIG. 7 illustrates an example block diagram (700) of a dynamic slope adjustment mechanism for a buck or buck-boost type regulator that is arranged according to an aspect of the present invention. The block diagram includes three gain blocks (710, 720 and 730), a divider block (740), and a ramp generator block (750). Although illustrated as separate functional blocks, the functions illustrated in block diagram 700 can be combined and/or separated as may be desired in a particular implementation.

The first gain block (710) is arranged to: receive an input signal (VREF) that is proportional to the output voltage (VOUT) of the regulator, and provide a scaled signal that is related to the input signal (VREF) according to a first constant (KR). The second gain block (720) is arranged to: receive an input signal (Vl) that is proportional to the value of the inductor (e.g., by measuring the inductor value as previously described), and provide a scaled signal that is related to the input signal (Vl) according to a second constant (Kl). The divider block (740) is arranged to: receive the scaled signals from the first and second gain blocks via terminals X and Y, and provide a ratio signal that is proportional to the ratio of the signals from the X and Y terminals (e.g., Z=X/Y). The third gain block (730) is arranged to: receive the ratio signal (e.g., X/Y) from the divider block, and provide a scaled signal that is related to the ratio signal according to a third constant (K). The ramp generator block (750) is arranged to: receive the scaled signal from the third gain block, and provide a ramp signal (e.g., RAMP) that has a slope corresponding to me. The ramp generator block can optionally include another gain scaling coefficient that corresponds to Ke.

In one example, signal VREF is a constant signal that represents the desired output voltage (e.g., VOUT) of the regulator. In another example, signal VREF is a signal that is directly proportional to the output voltage (e.g., VOUT) of the regulator through some kind of feedback arrangement (e.g., a resistor divider).

The slope (me) of the ramp signal (e.g., RAMP) can be mathematically expressed as:

$$m_e = \frac{V_{REF}}{V_l} \cdot \frac{(K_R \cdot K \cdot K_e)}{K_l} \qquad \text{(Eq. 1)}$$

As described previously, the downward slope associated with the inductor current in a buck or buck-boost regulator can be expressed as:

$$\frac{|V_{OUT}|}{L} \qquad \text{(Eq. 2)}$$

Since signal VREF is proportional to the output voltage (VOUT) and signal Vl is proportional to the value of the inductor (L), the value associated with the slope (me) of the ramp signal (RAMP) will track changes in the downward slope (m2) of the inductor current (e.g., IL). The various constants associated with the above-described function blocks (e.g., K, Ke, KR and Kl) can be adjusted to set the desired proportionality between slopes me and m2. According to the described slope adjustment method, the compensation ramp slope can be adjusted to compensate for the effects of variations in inductance values, and other parameters associated with the inductor current (e.g., VIN, VOUT, and load conditions).

Figure 8:
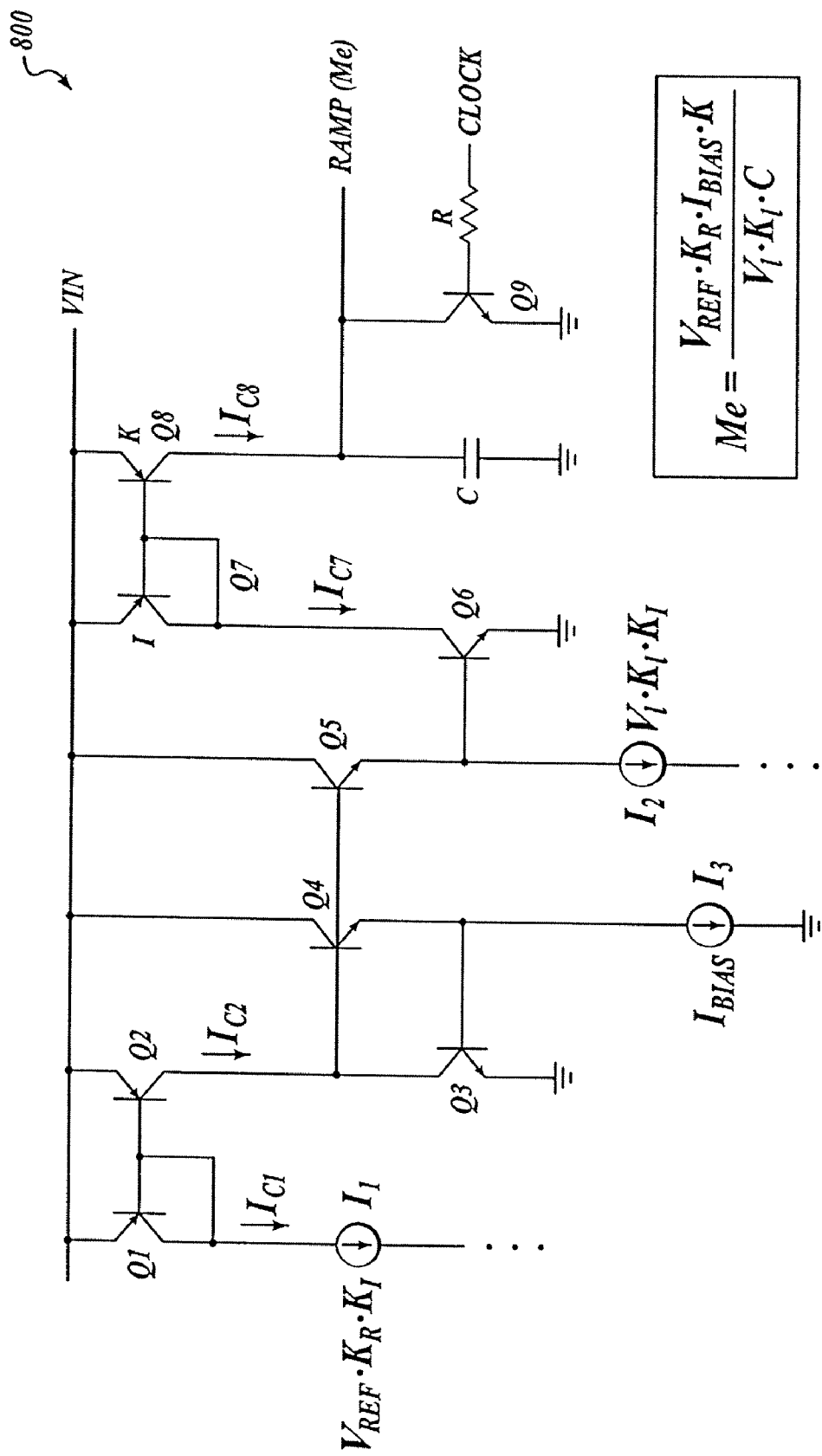
FIG. 8 illustrates an example schematic diagram for a circuit that is arranged to operate in accordance with the described block diagram illustrated by FIG. 7.

FIG. 8 illustrates an example schematic diagram for a circuit (800) that is arranged to operate in accordance with the described block diagram illustrated by FIG. 7. The example circuit includes nine transistors (Q1-Q9), three current sources (I1-I3), a capacitor (C), and a resistor (R).

Transistors Q1 and Q2 are arranged in a current-mirror configuration, where transistor Q1 is arranged to sense the current from current source I1, which has an operating current given by: I1=VREF*KR*KI. Transistors Q2 and Q3 are arranged to cooperate with one another to provide a common control signal to transistors Q4 and Q5. Transistor Q4 is arranged to cooperate with current source I3, which is biased to provide current IBIAS to transistors Q3 and Q4. Transistor Q5 is arranged to cooperate with current source I2, which has an operating current given by I2=Vl*Kl*KI. Transistor Q6 is responsive to the signal provided by transistor Q5 and current source I2. Transistors Q7 and Q8 are arranged in a current-mirror configuration, where transistor Q7 senses the current from transistor Q6 and transistor Q8 provides a scaled current according to scaling factor K. Transistor Q9 is responsive to a clock signal (CLOCK) via resistor R such that the ramp signal (RAMP) is reset to a ground potential when transistor Q9 is active. Capacitor C is arranged to receive the current from transistor Q8 when transistor Q9 is inactive such that the ramp signal is provided as a voltage across capacitor C.

The current (VREF*KR*KI) associated with current source I1 is proportional to the output voltage (VOUT) through signal VREF, while the current (Vl*Kl*KI) associated with current source I2 is proportional to the value of the inductance (L) of the power inductor. Transistors Q3, Q4, Q5, and Q6 are arranged to operate as a current divider that is responsive to currents I1 and I2. The output of the current divider is provided at the collector of transistor Q6. The current mirror ratio for transistors Q7 and Q8 corresponds to (1:K), where K is a constant that can control the rate (slope) of the ramp signal (RAMP). The ramp generator portion of the circuit includes the collector current of transistor Q8 and the value associated with capacitor C. Since the slope of the voltage across the capacitor is equal to IC8/C, where IC8 is the current from Q8, the ramp signal (RAMP) has a slope (me) that is given by:

$$m_e = \frac{V_{REF}}{V_l} \cdot \frac{(K_R \cdot K)}{K_l} \cdot \frac{I_{BIAS}}{C} \qquad \text{(Eq. 3)}$$

Eq.3 is in substantially the same form as Eq.2 such that adjustment of various constants can be employed to adjust the slope of the ramp signal as previously described.

Example Slope Compensation Mechanism for Boost Type Regulators

Figure 9:
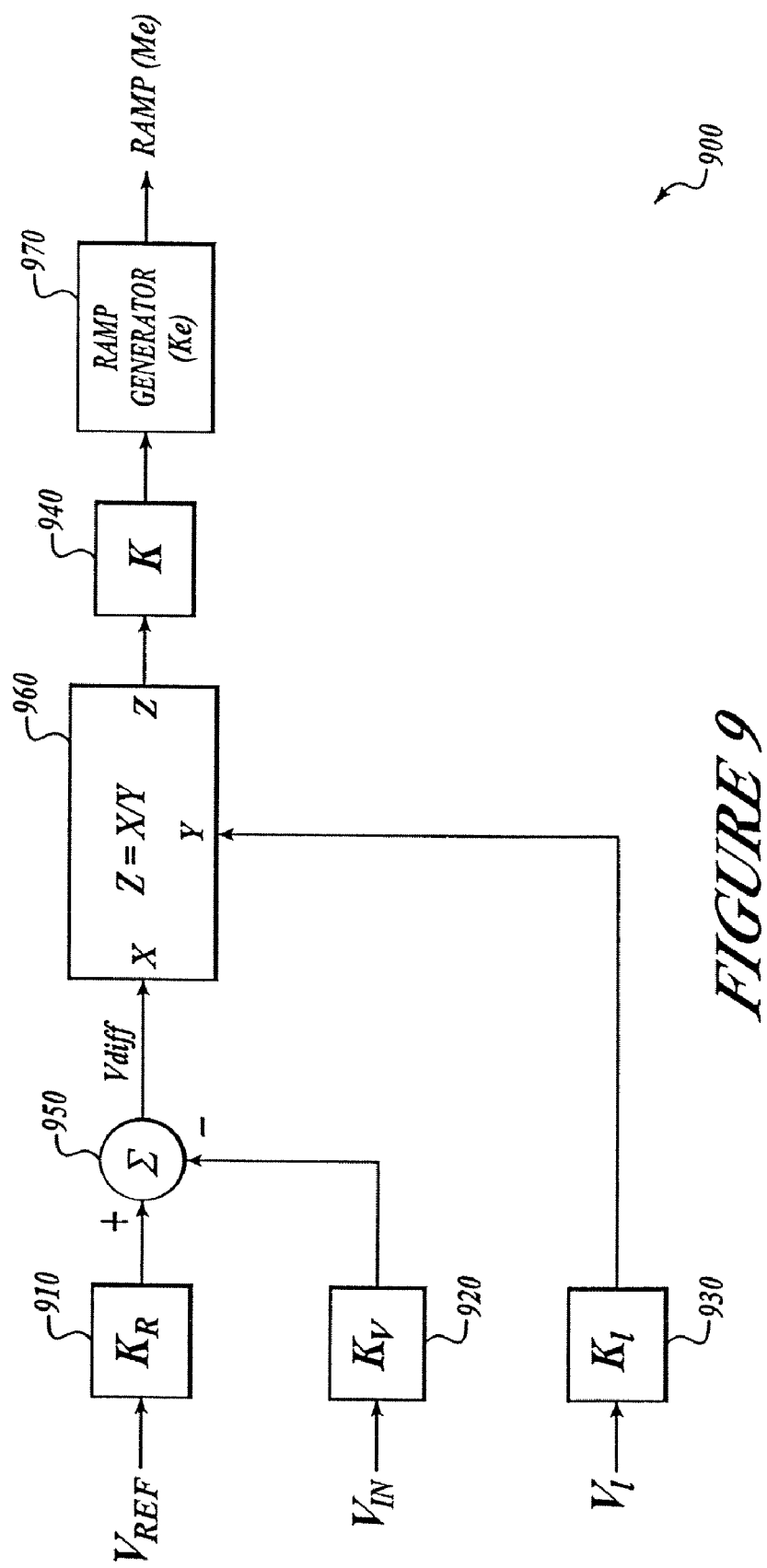
FIG. 9 illustrates an example block diagram (900) of a dynamic slope adjustment mechanism for a boost type regulator arranged according to at least some features of the present disclosure.

FIG. 9 illustrates an example block diagram (900) of a dynamic slope adjustment mechanism for a boost type regulator that is arranged according to an aspect of the present invention. The block diagram includes four gain blocks (910, 920, 930 and 940), a difference block (950), a divider block (960), and a ramp generator block (970). Although illustrated as separate functional blocks, the functions illustrated in block diagram 900 can be combined and/or separated as may be desired in a particular implementation.

The first gain block (910) is arranged to: receive an input signal (VREF) that is proportional to the output voltage (VOUT) of the regulator, and provide a scaled signal that is related to the input signal (VREF) according to a first constant (KR). The second gain block (920) is arranged to: receive an input signal (VIN) that is proportional to the input voltage of the regulator, and provide a scaled signal that is related to the input signal (VIN) according to a second constant (KV). The third gain block (930) is arranged to: receive an input signal (Vl) that is proportional to the value of the inductor (e.g., by measuring the inductor value as previously described), and provide a scaled signal that is related to the input signal (Vl) according to a third constant (Kl). The difference block (950) is arranged to receive the scaled signals from the first and second gain blocks and provide a difference signal (VDIFF) that is proportional to the difference between signals VREF and VIN. The divider block (960) is arranged to: receive the scaled signals from the difference block and third gain blocks via terminals X and Y, and provide a ratio signal that is proportional to the ratio of the signals from the X and Y terminals (e.g., Z=X/Y). The fourth gain block (940) is arranged to: receive the ratio signal (e.g., X/Y) from the divider block, and provide a scaled signal that is related to the ratio signal according to a fourth constant (K). The ramp generator block (970) is arranged to: receive the scaled signal from the fourth gain block, and provide a ramp signal (e.g., RAMP) that has a slope corresponding to me. The ramp generator can optionally include another gain scaling coefficient that corresponds to Ke.

In one example, signal VREF is a constant signal that represents the desired output voltage (e.g., VOUT) of the regulator. In another example, signal VREF is a signal that is directly proportional to the output voltage (e.g., VOUT) of the regulator through some kind of feedback arrangement (e.g., a resistor divider).

The slope (me) of the ramp signal (e.g., RAMP) can be mathematically expressed as:

$$m_e = \frac{(V_{REF} \cdot K_R - V_{IN} \cdot K_V)}{V_l} \cdot \frac{(K \cdot K_e)}{K_l} \quad \text{(Eq. 4)}$$

As described previously, the downward slope associated with the inductor current in a boost regulator can be expressed as:

$$m_2 = \frac{V_{out} - V_{IN}}{L} \quad \text{(Eq. 5)}$$

Since signal VREF is proportional to the output voltage (VOUT), signal Vl is proportional to the value of the inductor (L), and signal VIN*KV is proportional to the input voltage (VIN), the value associated with the slope (me) of the ramp signal (RAMP) will track changes in the downward slope (m2) of the inductor current (e.g., IL). The various constants associated with the above-described function blocks (e.g., K, Ke, KR, KV and Kl) can again be adjusted to set the desired proportionality between slopes me and m2. According to the described slope adjustment method, the compensation ramp slope can be adjusted to compensate for the effects of variations in inductance values, and other parameters associated with the inductor current (e.g., VIN, VOUT, and load conditions).

Figure 10:
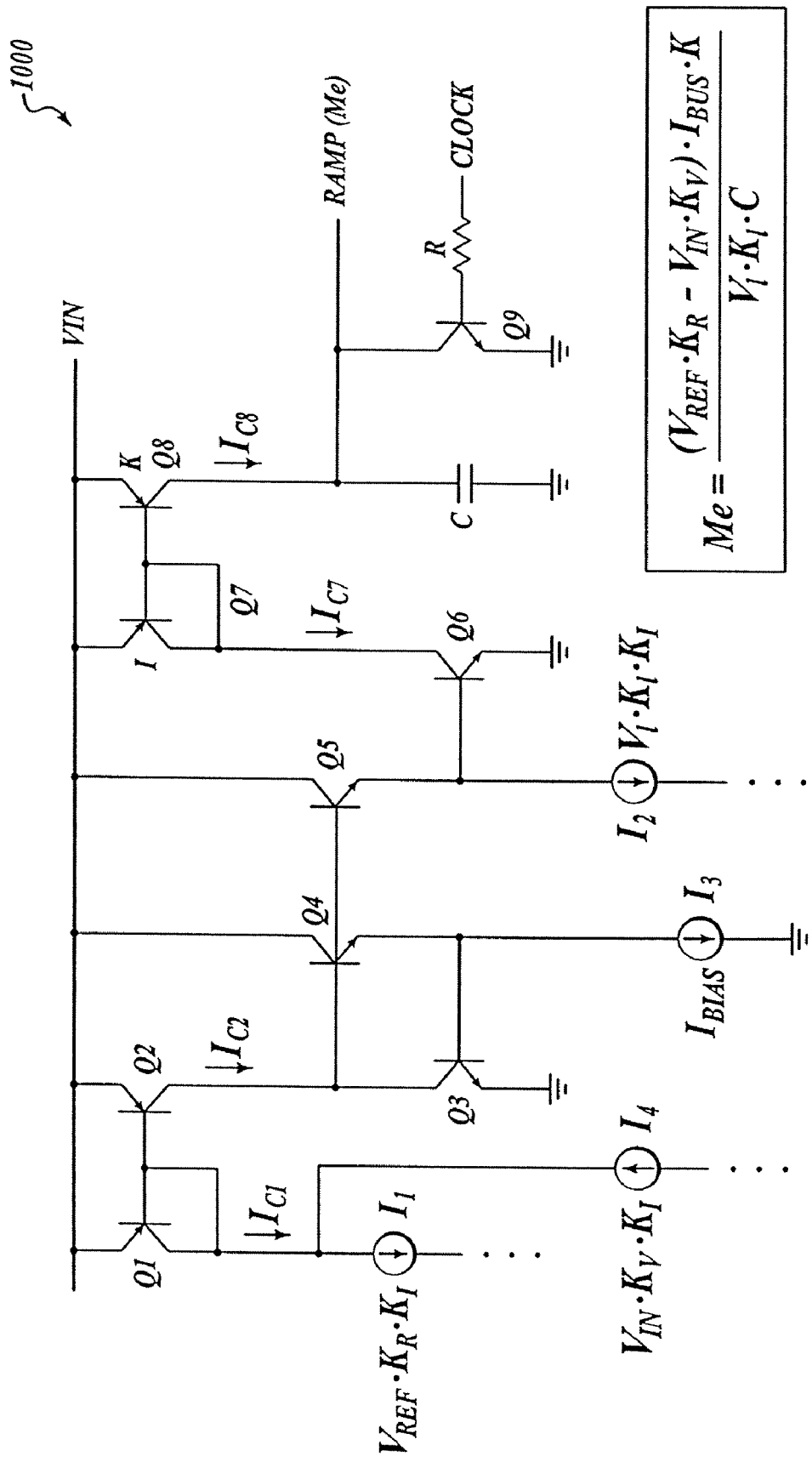
FIG. 10 illustrates an example schematic diagram for a circuit that is arranged to operate in accordance with the described block diagram illustrated by FIG. 9.

FIG. 10 illustrates an example schematic diagram for a circuit (1000) that is arranged to operate in accordance with the described block diagram illustrated by FIG. 9. Example circuit 1000 includes nine transistors (Q1-Q9), four current sources (I1-I4), a capacitor (C), and a resistor (R). FIG. 10 is substantially the same as FIG. 8 with the addition of current source 14, which is coupled to the collector of transistor Q1. Current source 14 is arranged to provide a current that corresponds to I4=VIN*KV*KI. With the addition of current source 14, the collector current (IC1) of transistor Q1 corresponds to:

$$IC1 = I1 - I4 = (VREF \cdot KR \cdot KI) - (VIN \cdot KV \cdot KI) \quad \text{(Eq.6)}$$

As described before, with respect to Eq.3, the voltage across the capacitor is determined by IC8/C. However, since current source 14 is included in FIG. 10, current IC8 will include portions of current I1 and I4 through the various current mirror arrangements such that, the resulting ramp signal (RAMP) has a slope (me) that is given by:

$$m_e = \frac{(V_{REF} \cdot K_R - V_{IN} \cdot K_V)}{V_l} \cdot \frac{K}{K_l} \cdot \frac{I_{BIAS}}{C} \quad \text{(Eq. 7)}$$

Eq.7 is in substantially the same form as Eq.4 such that adjustment of various constants can be employed to adjust the slope of the ramp signal as previously described.

Example Capacitive Adjustment Mechanisms for Slope Compensation

As described above with respect to FIGS. 7-10, the slope of the inductor current is adjusted by changing the scaling constants associated with the various gain blocks. For example, the current mirror ratio as set by scaling constant K in FIGS. 8 and 10 can be varied to change the slope compensation of the inductor current. Some alternative ways to scale the slope compensation are illustrated by FIGS. 11 and 12.

Figure 11:
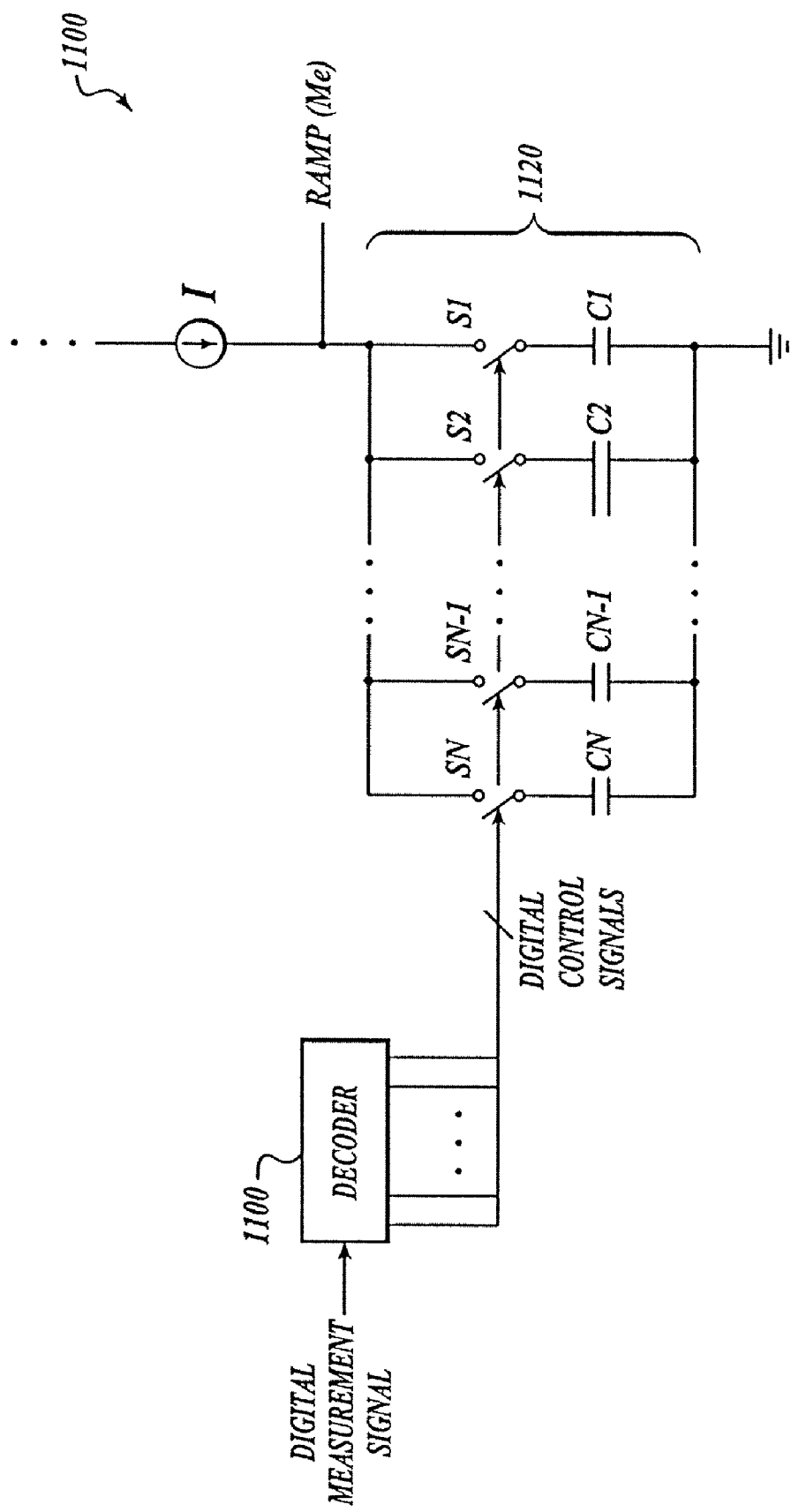
FIG. 11 illustrates an example schematic diagram for a ramp generator circuit arranged according to at least some features of the present disclosure.

FIG. 11 illustrates an example schematic diagram for a ramp generator circuit (1100) that is arranged to operate in accordance with an aspect of the present invention. The ramp generator circuit (1100) may be configured to operate as a portion of the control circuit for the power switch in the switching regulator. Ramp generator circuit 1100 includes a decoder logic block (1110), an array of capacitor circuits (1120), and a current source (I).

A digital measurement signal is obtained in the system (e.g., see FIG. 1), where the digital measurement signal corresponds to a measurement such as a value for the inductor (or average value as may be desired) in the switching regulator. The digital measurement signal is provided to decoder logic block 1110, which is arranged to provide an array of digital control signals. Capacitor circuits 1120 are arranged as a set of selectable capacitors that are selectively coupled in parallel to one another based on the array of digital control signals from the decoder logic block (1110). The effective total capacitance from the array of capacitor circuits operates as a single capacitive value for the ramp capacitor (C) in the ramp generator circuit, where the slope of the ramp is variable in response to the digital measurement signal.

Figure 12:
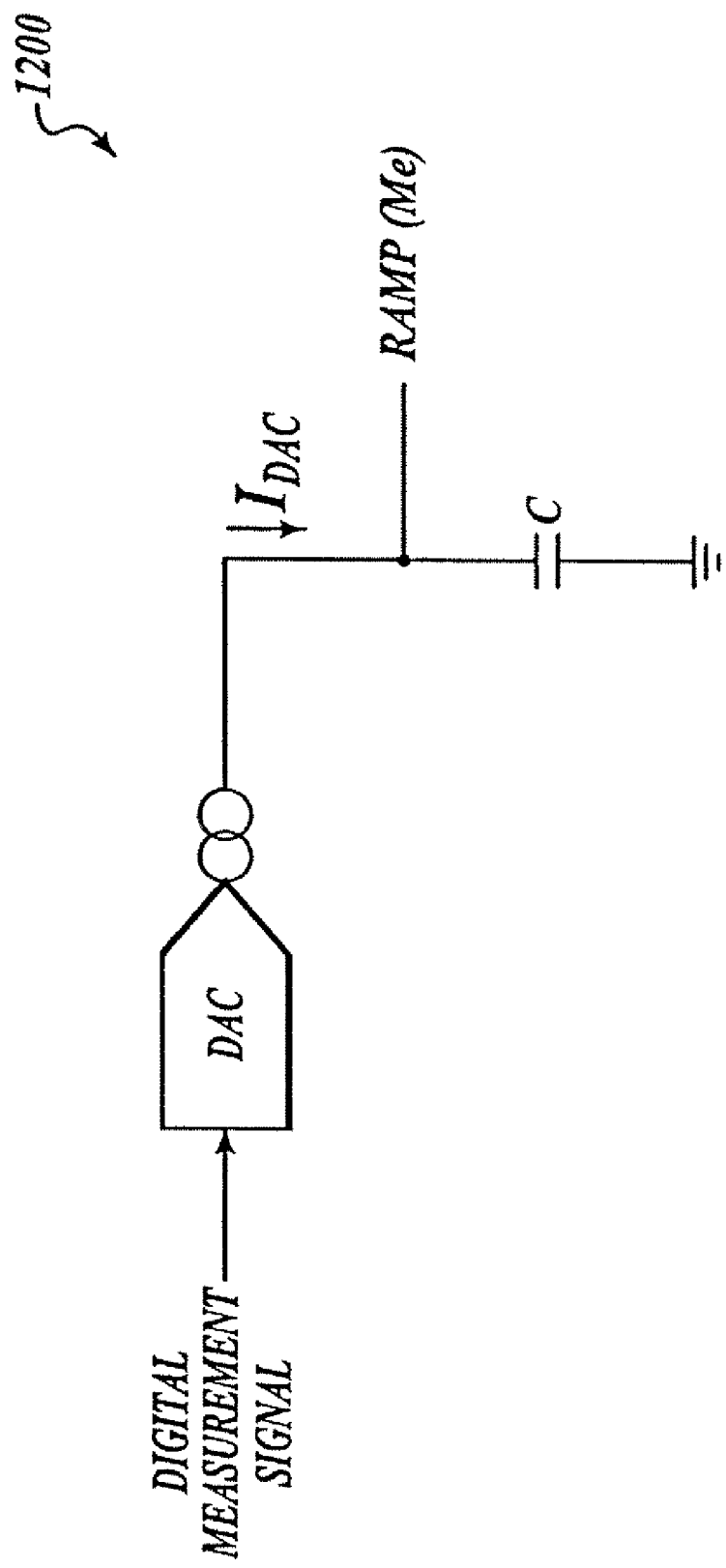
FIG. 12 illustrates another example schematic diagram for a ramp generator circuit arranged in accordance with aspects of the present invention.

FIG. 12 illustrates another example schematic diagram for a ramp generator circuit (1200) that is arranged to operate in accordance with an aspect of the present invention. The ramp generator circuit (1200) may be configured to operate as a portion of the control circuit for the power switch in the switching regulator (e.g. see FIGS. 1-6 and related discussion). Ramp generator circuit 1200 includes a digital-to-analog converter (DAC) circuit that is responsive to a digital measurement signal (e.g., a measured value for the inductor). The DAC circuit is arranged to provide a programmable output current to the capacitor in the ramp circuit such that the slope of the inductor current is adjusted.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for adjusting slope compensation in a switching regulator that includes an inductor, the apparatus comprising:
   a divider block that is arranged to: receive a first signal, receive a second signal, and provide a divide signal that is proportional to a division of the first signal by the second signal, wherein the first signal is associated with an output voltage ($V_{OUT}$) of the switching regulator, and wherein the second signal is related to a measured value associated with the inductor;
   a ramp generator block that is responsive to the divide signal such that the slope of the ramp signal dynamically adjusted in response to the output voltage of the switching regulator and the measured value associated with the inductor; and
   a difference circuit that is arranged to: receive a first input signal ($V_{REF}$) that is associated with the output voltage ($V_{OUT}$), receive a second input signal ($V_{IN}$) that is associated with an input voltage, and provide the first signal ($V_{DIFF}$) as a difference between the first in put signal ($V_{REF}$) and the second input signal ($V_{IN}$).

2. The apparatus of claim 1 further comprising: a gain block that is arranged to receive the divide signal and provide a scaled signal to the ramp generator block, wherein the scaled signal is related to the divide signal according to a scaling factor (K).

3. The apparatus of claim 1 further comprising: a gain block that is arranged to receive the first signal and provide a scaled signal to the divide block, wherein the scaled signal is related to the first signal according to a scaling factor ($K_R$).

4. The apparatus of claim 1 further comprising: a gain block that is arranged to receive the second signal and provide a scaled signal to the divide block, wherein the scaled signal is related to the second signal according to a scaling factor ($K_1$).

5. The apparatus of claim 1, wherein the switching regulator is a boost regulator and the first signal corresponds to a difference between the output voltage of the switching regulator ($V_{OUT}$) and an input voltage of the switching regulator ($V_{IN}$).

6. The apparatus of claim 1, further comprising:
a first gain block that is arranged to: receive a first input signal ($V_{REF}$) that is associated with the output voltage ($V_{OUT}$), and provide a first scaled signal that is related to the first input signal ($V_{REF}$) according to a first scaling factor ($K_R$);
a second gain block that is arranged to: receive a second input signal ($V_{IN}$) that is associated with an input voltage of the switching regulator, and provide a second scaled signal that is related to the second input signal ($V_{IN}$) according to a second scaling factor ($K_V$); and
a difference circuit that is arranged to: receive the first scaled signal, receive the second scaled signal, and provides the first signal as a difference ($V_{DIFF}$) between the first scaled signal and the second input signal.

7. The apparatus of claim 1, wherein the apparatus is further arranged such that the first signal is associated with a set point for the output voltage ($V_{OUT}$) of the switching regulator.

8. The apparatus of claim 1, wherein the apparatus is further arranged such that the first signal is associated with the output voltage ($V_{OUT}$) of the switching regulator via a feedback circuit.

9. An apparatus for adjusting slope compensation in a switching regulator that includes an inductor, the apparatus comprising:
a first gain block that includes a first input terminal and a first output terminal, wherein the first input terminal is arranged to receive a first input signal ($V_{REF}$), wherein the first gain block is arranged to generate a first scaled signal at the first output terminal that is related to the first input signal ($V_{REF}$) according to a first constant ($K_R$);
a second gain block that includes a second input terminal and a second output terminal, wherein the second input terminal is arranged to receive a second input signal ($V_1$) that is proportional to a value of the inductor, wherein the second gain block is arranged to generate a second scaled signal at the second output terminal that is related to the second input signal ($V_1$) according to a second constant ($K_1$);
a divider block that includes a third input terminal, a fourth input terminal, and a third output terminal, wherein the third input terminal is coupled to the first output terminal and arranged to receive the first scaled signal, the fourth input terminal is coupled to the second output terminal and arranged to receive the second scaled signal, and the divider block is arranged to provide a divide signal at the third output terminal that is proportional to a division of the first scaled signal by the second scaled signal;
a ramp generator block that includes a fifth input terminal that is arranged to receive the divide signal and a fourth output terminal that is arranged to generate a ramp signal that is responsive to the divide signal such that the slope of the ramp signal is dynamically adjusted in response to changes in the output voltage ($V_{OUT}$) of the switching regulator and the measured value associated with the inductor; and
a third gain block that coupled between the divider block and the ramp generator block, wherein the third gain block is arranged to scale the divide signal a third constant (K) to provide a third scaled signal, and wherein the third scaled signal is coupled to the fifth input terminal of the ramp generator block.

10. The apparatus of claim 9 further comprising a difference block that is coupled between the first output terminal and the third input terminal, wherein the difference block is arranged to generate a difference signal ($V_{DIFF}$) at the third input terminal that is proportional to the difference between the first scaled signal and another signal that is proportional to an input voltage of the switching regulator.

11. The apparatus of claim 9, wherein the first input signal ($V_{REF}$) corresponds to either a constant signal that represents a desired output voltage of the switching regulator, or a feedback signal that is directly proportion to an output voltage ($V_{OUT}$) of the switching regulator.

12. The apparatus of claim 9, further comprising a feedback circuit that is arranged to provide the first input signal ($V_{REF}$) in response to an output voltage ($V_{OUT}$) of the switching regulator.

13. The apparatus of claim 12, wherein the feedback circuit is a resistor divider circuit.

14. An apparatus for adjusting slope compensation in a switching regulator that includes an inductor, the apparatus comprising:
a first gain block that includes a first input terminal and a first output terminal, wherein the first input terminal is arranged to receive a first input signal ($V_{REF}$), wherein the first gain block is arranged to generate a first scaled signal at the first output terminal that is related to the first input signal ($V_{REF}$) according to a first constant ($K_R$);
a second gain block that includes a second input terminal and a second output terminal, wherein the second input terminal is arranged to receive a second input signal ($V_{IN}$) that is proportional to an input voltage of switching regulator, wherein the second gain block is arranged to generate a second scaled signal at the second output terminal that is related to the second input signal ($V_{IN}$) according to a second constant ($K_V$);
a third gain block that includes a third input terminal and a third output terminal, wherein the third input terminal is arranged to receive a third input signal ($V_1$) that is proportional to a value of the inductor, wherein the third gain block is arranged to generate a third scaled signal at the third output terminal that is related to the third input signal ($V_1$) according to a third constant ($K_1$);
a difference block that includes a fourth input terminal, fifth input terminal, and a fourth output terminal, wherein the fourth input terminal is coupled to the first output terminal and arranged to receive the first scaled signal, the fifth input terminal is coupled to the second output terminal and arranged to receive the second scaled signal, wherein the difference block is configured to provide a difference signal ($V_{DIFF}$) at the fourth output terminal that is proportional to the difference between the first scaled signal and the second scaled signal;

a divider block that includes a sixth input terminal, a seventh input terminal, and a fifth output terminal, wherein the sixth input terminal is coupled to the fourth output terminal and arranged to receive the difference signal ($V_{DIFF}$), the seventh input terminal is coupled to the third output terminal and arranged to receive the third scaled signal, and the divider block is arranged to provide a divide signal at the fifth output terminal that is proportional to a division of the difference signal ($V_{DIFF}$) by the third scaled signal; and a ramp generator block that includes an eighth input terminal that is arranged to receive the divide signal and a sixth output terminal that is arranged to generate a ramp signal that is responsive to the divide signal such that the slope of the ramp signal is dynamically adjusted in response to changes in the output voltage ($V_{OUT}$) of the switching regulator and the measured value associated with the inductor.

15. The apparatus of claim 14 further comprising: a fourth gain block that is coupled between the divider block and the ramp generator block, wherein the fourth gain block is arranged to scale the divide signal a fourth constant (K) to provide a fourth scaled signal that is coupled to the fifth input terminal of the ramp generator block.

16. The apparatus of claim 14, wherein the first input signal ($V_{REF}$) corresponds to either a constant signal that represents a desired output voltage of the switching regulator, or a feedback signal that is directly proportion to an output voltage ($V_{OUT}$) of the switching regulator.

17. The apparatus of claim 14, further comprising a feedback circuit that is arranged to provide the first input signal ($V_{REF}$) in response to an output voltage ($V_{OUT}$) of the switching regulator.

18. The apparatus of claim 17, wherein the feedback circuit is a resistor divider circuit.

\* \* \* \* \*